A. HARCUM.
Ornamenting Glassware.
No. 202,647.      Patented April 23, 1878.
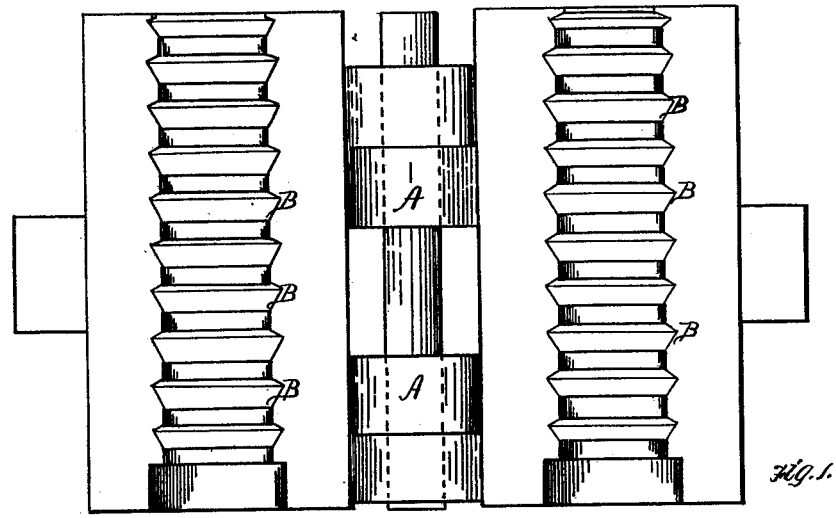
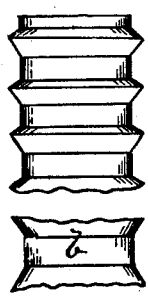
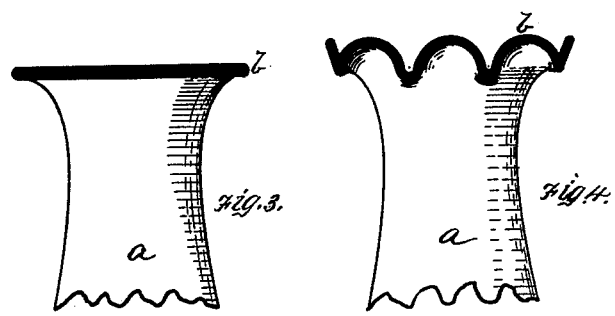

UNITED STATES PATENT OFFICE.

ANDREW HARCUM, OF SCOTT TOWNSHIP, ALLEGHENY COUNTY, PA., ASSIGNOR TO HIMSELF AND WILLIAM HAPE, OF SAME PLACE.

IMPROVEMENT IN ORNAMENTING GLASSWARE.

Specification forming part of Letters Patent No. 202,647, dated April 23, 1878; application filed March 13, 1878.

*To all whom it may concern:*

Be it known that I, ANDREW HARCUM, of Scott township, in the county of Allegheny and State of Pennsylvania, have invented a new and useful Improvement in Ornamenting Glassware; and I do hereby declare the following to be a full, clear, and exact description thereof, reference being had to the accompanying drawings, making part of this specification, in which—

Figure 1 represents a mold adapted to the manufacture of tips used in applying my method. Fig. 2 is a view of a tip. Fig. 3 is a view of a flared chimney. Fig. 4 is a view of a flared and crimped chimney, illustrating my invention; and Fig. 5 is a modified form of tipping-piece.

Like letters refer to like parts wherever they occur.

My invention relates to the ornamentation of hollow articles of glassware, such as lamp-chimneys, smoke-bells, vases, and other articles which may be, or are at present, finished by tipping.

The ordinary method of tipping articles of the class specified is to gather a small portion of molten glass of the desired color upon a rod, and to apply the same to the article to be tipped, the latter having been previously shaped and reheated; after which the article is again heated, fire-polished, and finished. Such a method of tipping requires skilled labor, an extra hand to tend the colored glass, and is too slow to meet the demands of the trade, as only from one hundred to one hundred and fifty chimneys can be so finished in a turn of five and a half hours, whereas a competent blower can produce from two hundred and fifty to three hundred chimneys in the same time.

A second method of tipping hollow articles of glassware, for which Letters Patent No. 196,633 were granted to me, October 30, 1877, consists in applying the tipping material, in a powdered condition, to the reheated article, and subsequently melting in and finishing the same. This latter method, while capable of being worked as rapidly as the chimney or like article can be formed, and adapted to be used by unskilled labor, yet requires care to obtain uniform results and a neat appearance of the finished article.

The object of the present invention is not only to simplify the process of tipping hollow articles of glassware, so that it can be done by unskilled labor as rapidly as the art demands, but also to render it so exact that uniform results and neatly-finished articles will be produced if ordinary care and attention are had upon the part of the laborer.

To this end, my invention consists in forming, either by pressing or blowing, a ring or like shape, corresponding to the shape and size of the unfinished edge of the article, reheating one or both of the edges to be united, bringing the parts in contact, and subsequently warming in and finishing in the usual manner.

I will now proceed to describe my invention so that others skilled in the art to which it appertains may apply the same.

I first produce a tip piece or ring corresponding somewhat in shape and size to the unfinished edge of the article to be tipped, and of the desired color. In the present instance the article chosen for illustrating the process is the lamp-chimney $a$, and the tip therefor would be a ring, $b$.

To form the ring or tip-piece, I employ either a press-mold or blow-mold, the latter being preferred on account of the number of tip-pieces that can be produced at a time and the condition in which the glass tip $b$ is left—viz., lightness and the easiness of reheating. I have therefore shown, for the purposes of this description, a two-part mold, A, formed with a continuous series of annular recesses, B, wherein is blown, in manner well known to the art, a connected series of rings or tips, which can be subsequently cracked apart for use.

The article to be tipped—as, for instance, the chimney $a$—is blown or otherwise formed in the usual manner, and on the edge thereof to be tipped is placed a tipping-piece, $b$, which has been properly heated, the edge of the article to be tipped being likewise reheated, if necessary.

The article, with tipping-ring thereon, is inserted in the glory-hole and heated sufficiently to cause the two pieces to weld, after which the article is removed and finished in the ordinary manner. If it is a chimney it may be flared, or flared and crimped, either by hand or by machinery, as preferred.

As before specified, the tipping-pieces *b* are reheated before being applied to the article, and in order to save time I prefer to heat them in large quantities, using for that purpose a metallic plate or hearth suitably set in a furnace.

If desired, the rough edges or "blow-over" incident to the blown tipping-piece *b* may be trimmed off, which will tend to insure the uniformity of the tipping in the finished article; but where the tipping ring or piece is produced by pressing there will of course be no ragged edge to remove.

If desired, the tip may be formed with crimp and flare at the time of blowing or molding the same, as shown in Fig. 5 of the drawing, which will obviate the necessity of subsequently flaring and crimping the article, the only objection thereto being that the tipping color will have to extend farther down on the finished article than is often desirable.

I am aware that parti-colored shades, globes, &c., have been formed by blowing or partially forming a gathering of one colored glass, opening the lower end thereof, and attaching thereto a gathering or unformed mass of a second color, and do not claim the same, as such a process can only be followed where a considerable portion of the article is to be subsequently formed; but Having thus set forth the nature and advantages of my invention, what I claim, and desire to secure by Letters Patent, is—

As an improvement in tipping glassware of the class specified, forming the tipping-piece independently, then reheating the same and attaching it to the article to be ornamented, subsequently reheating or warming in the parts thus brought together to cause them to weld or unite, and finally finishing the article in the usual manner, substantially as specified.

In testimony whereof I, the said ANDREW HARCUM, have hereunto set my hand.

ANDREW HARCUM.

Witnesses:
F. H. RITTER, Jr.,
R. W. WHITTLESEY.